US009364749B2

(12) United States Patent
Yamagishi (10) Patent No.: US 9,364,749 B2
(45) Date of Patent: Jun. 14, 2016

(54) OPERATION ELEMENT AND OPERATION DEVICE (75) Inventor: Takeshi Yamagishi, Kanagawa (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 97 days.

(21) Appl. No.: 14/355,338

(22) PCT Filed: Nov. 7, 2011

(86) PCT No.: PCT/JP2011/075617
§ 371 (c)(1),
(2), (4) Date: Apr. 30, 2014

(87) PCT Pub. No.: WO2013/069084
PCT Pub. Date: May 16, 2013

(65) Prior Publication Data
US 2014/0248958 A1 Sep. 4, 2014

(51) Int. Cl.
*A63F 9/24* (2006.01)
*A63F 13/20* (2014.01)
*H01H 13/14* (2006.01)
*H01H 3/60* (2006.01)
*A63F 13/24* (2014.01)
*A63F 13/218* (2014.01)
(Continued)

(52) U.S. Cl.
CPC ............... *A63F 13/06* (2013.01); *A63F 13/218* (2014.09); *A63F 13/24* (2014.09); *H01H 3/605* (2013.01); *H01H 13/14* (2013.01); *A63F 13/22* (2014.09); *A63F 13/245* (2014.09); *H01H 2217/016* (2013.01); *H01H 2221/062* (2013.01); *H01H 2221/064* (2013.01); *H01H 2227/034* (2013.01)

(58) Field of Classification Search
CPC .................. H01H 2227/022; H01H 2215/014; H01H 13/702–13/705; H01H 13/7073; H01H 13/7065; H01H 13/7057; H01H 2215/01; H01H 2215/008; H01H 2217/016; H01H 2221/038; H01H 2231/008; H01H 13/84; H01H 2215/002; H01H 2215/004; A63F 13/218; A63F 13/24
See application file for complete search history.

(56) References Cited

U.S. PATENT DOCUMENTS 7,608,314 B2 * 10/2009 Plant ..................... A41D 31/005
428/116
2001/0008849 A1 * 7/2001 Komata .................. A63F 13/10
463/37

(Continued)

FOREIGN PATENT DOCUMENTS

JP 2001283682 A 10/2001

OTHER PUBLICATIONS

International Preliminary Report on Patentability and Written Opinion for corresponding PCT/JP2011/075617, dated May 22, 2014.
(Continued)

*Primary Examiner* — Pierre E Elisca
*Assistant Examiner* — Carl V Larsen
(74) *Attorney, Agent, or Firm* — Matthew B. Dernier, Esq.

(57) ABSTRACT

An operation element has an operation body displaced according to pressing operation, a detection body that is pressed according to displacement of the operation body and detects the displacement of this operation body, and an interposed body interposed between the operation body and the detection body. Of these, the interposed body has an enclosing body in which a dilatant fluid is enclosed. The enclosing body has flexibility.

4 Claims, 7 Drawing Sheets (51) Int. Cl.
*A63F 13/245* (2014.01)
*A63F 13/22* (2014.01)

(56) References Cited

U.S. PATENT DOCUMENTS

| | | | | |
|---|---|---|---|---|
| 2004/0026222 A1* | 2/2004 | Adachi | ............... | H01H 13/702 200/512 |
| 2007/0070053 A1* | 3/2007 | Lapstun | ............... | B43K 7/005 345/179 |
| 2009/0131171 A1 | 5/2009 | Miyazaki | | |
| 2009/0286910 A1* | 11/2009 | Bloomfield | ............. | C08L 21/00 524/269 |
| 2011/0214974 A1* | 9/2011 | Bigand | ............... | H01H 13/702 200/345 |
| 2013/0076086 A1* | 3/2013 | Pickett | ................... | B60N 2/48 297/216.12 |

OTHER PUBLICATIONS

International Search Report for corresponding PCT/JP2011/075617, dated Dec. 13, 2011.

* cited by examiner

OPERATION ELEMENT AND OPERATION DEVICE

TECHNICAL FIELD

The present invention relates to an operation element and an operation device.

BACKGROUND ART

Conventionally, an operation device that is connected to an information processing device such as a PC (Personal Computer) and a game device and transmits an operation signal to this information processing device is known (e.g. refer to PTL 1).

The controller (operation device) described in this PTL 1 has a left grip part and a right grip part held with the left and right hands of a user and directional keys and operation keys placed on the front surface of this controller. Of these, the directional keys are placed at positions corresponding to the thumb when the left grip part is held with the left hand and the operation keys are placed at positions corresponding to the thumb when the right grip part is held with the right hand.

Furthermore, this controller is provided with two analog sticks between the left grip part and the right grip part.

CITATION LIST

Patent Literature

[PTL 1]
  US 2009/0131171

SUMMARY

Technical Problem

In the meantime, for the directional keys and the operation keys, a configuration having an operation body (key top) and a detection body that detects pressing by this operation body is general. However, such a configuration has a problem that operation properties and operation feeling are the same even when the pressing force to the operation body is changed.

An object of the present invention is to provide an operation element and an operation device that allow operation properties and operation feeling to be made different according to operation.

Solution to Problem

To achieve the above-described object, an operation element according to one mode of the present invention is characterized by the following. The operation element has an operation body displaced according to pressing operation, a detection body that is pressed according to displacement of the operation body and detects the displacement of the operation body, and an interposed body interposed between the operation body and the detection body. The interposed body has an enclosing body in which a dilatant fluid is enclosed and the enclosing body has flexibility.

Furthermore, an operation device according to one mode of the present invention is characterized by including the above-described operation element.

DESCRIPTION OF EMBODIMENTS

[First Embodiment]

A first embodiment of the present invention will be described below based on the drawings.

Figure 1:
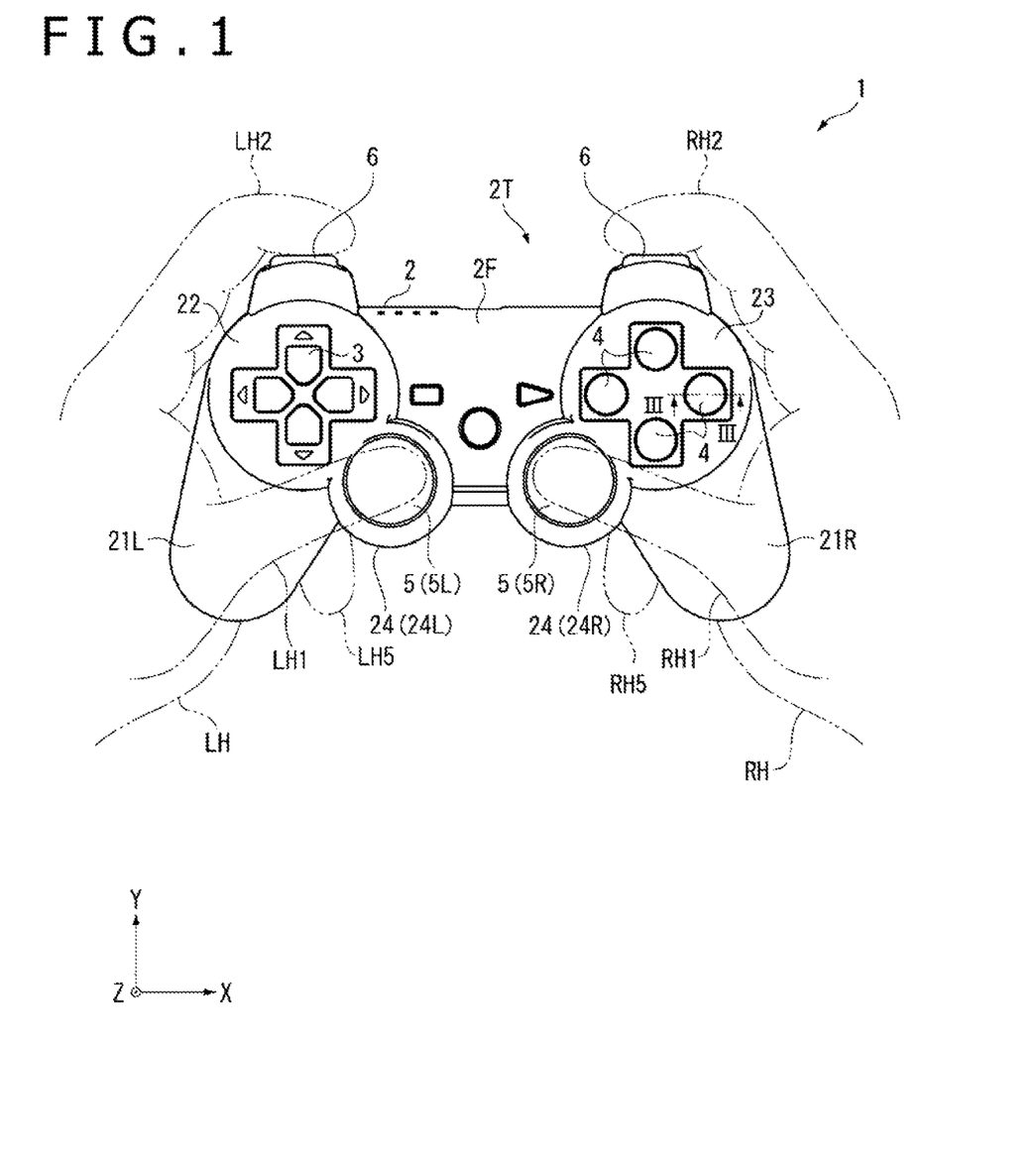
FIG. 1 is a front view showing an operation device according to a first embodiment of the present invention.
Figure 2:
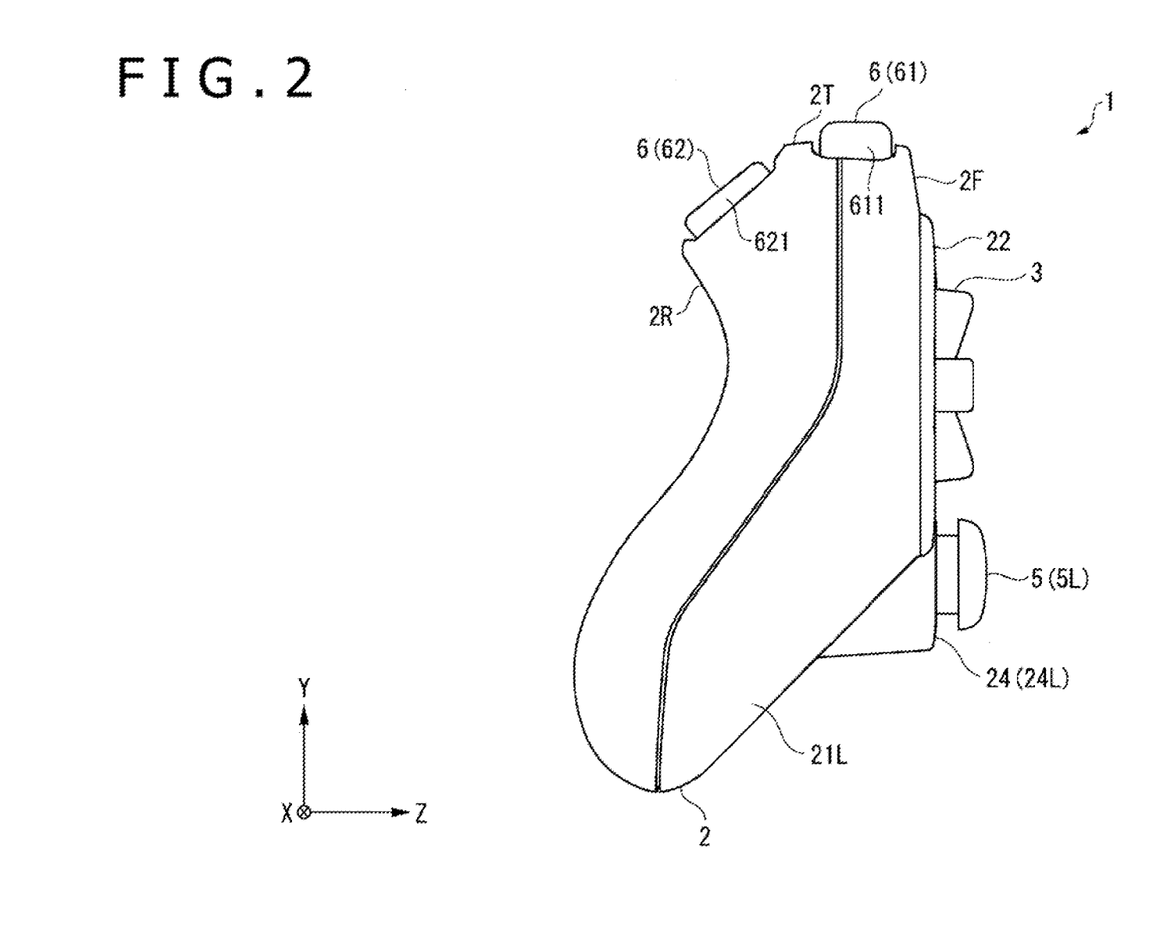
FIG. 2 is a side view showing the operation device in the first embodiment.

FIG. 1 and FIG. 2 are a front view and a side view showing an operation device 1 according to the present embodiment. In the following drawings, the X-direction and the Y-direction indicate the right direction and the upper direction when an exterior chassis 2 is held and seen from a front view, and the Z-direction is the direction toward the near side when this exterior chassis 2 is seen from a front view. That is, the X-direction, the Y-direction, and the Z-direction are perpendicular to each other.

The operation device 1 according to the present embodiment is connected to an information processing device such as a PC and a game device and transmits an operation signal according to input operation to this information processing device. This operation device 1 has the exterior chassis 2 made of a synthetic resin as shown in FIG. 1 and FIG. 2.

[Configuration of Exterior Chassis]

The exterior chassis 2 has a left grip part 21L held with a left hand LH of a user and a right grip part 21R held with a right hand RH of the user. Furthermore, in a front surface 2F of the exterior chassis 2, a first placement part 22 at which operation elements 3 as directional keys in a cross manner are placed is provided at a position corresponding to a thumb LH1 when the left grip part 21L is held with the left hand LH. Moreover, in this front surface 2F, a second placement part 23 at which operation elements 4 as four operation keys are placed is provided at a position corresponding to a thumb RH1 when the right grip part 21R is held with the right hand RH.

Besides, in the front surface 2F, operation element placement parts 24 (left and right operation element placement parts are defined as 24L and 24R, respectively) at each of which a respective one of operation elements 5 (5L and 5R) as analog sticks is placed are provided between the first placement part 22 and the second placement part 23. Furthermore, in a top surface 2T of the exterior chassis 2, operation elements 6 (61 and 62) as other operation keys are provided on the left and right sides. Of these operation elements 6, the operation element 61 is formed as a button in which an operation body 611 as a key top forming this operation element 61 protrudes from and retracts into the top surface 2T. On the other hand, the operation element 62 is provided on the side of a rear surface 2R relative to the operation element 61. An end part of an operation body 621 forming this operation element 62 on the side of the front surface 2F is pivotally supported on the exterior chassis 2 and this operation element 62 is formed as a button in which an end part on the side of the rear surface 2R protrudes from and retracts into the rear surface 2R about a pivot axis along the X-direction. That is, this operation element 62 is formed as a button in a trigger manner. The placement positions of these left and right operation elements 6 are positions corresponding to forefingers LH2 and RH2 of the user.

When using such an operation device 1, the user holds the left grip part 21L and the right grip part 21R in such a manner as to wrap them in the palms, little fingers LH5 and RH5, and third fingers (not shown) of the left and right hands LH and RH for example. Then, the user inputs the operation elements 6 with the left and right forefingers LH2 and RH2 and inputs the operation elements 3 as the directional keys and the operation elements 4 as the operation keys with the left and right thumbs LH1 and RH1. Furthermore, in the case of operating the operation elements 5L and 5R in this state, the user operates them with the left and right thumbs LH1 and RH1.

[Configuration of Operation Element]

Figure 3:
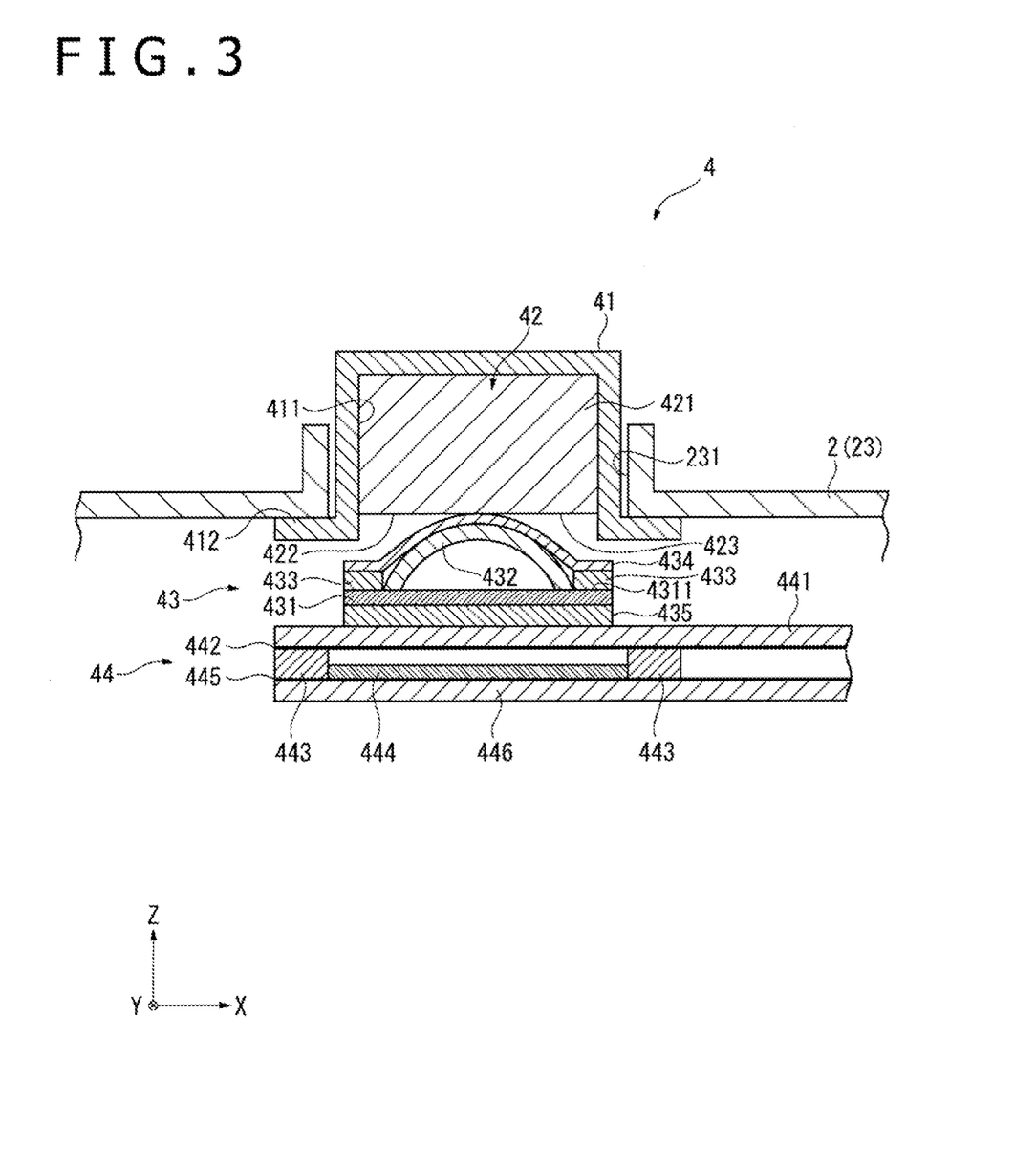
FIG. 3 is a sectional view of an operation element in the first embodiment.

FIG. 3 is a sectional view showing the operation element 4. Specifically, FIG. 3 is a schematic diagram showing a section of the operation device 1 at the position indicated by a dotted line in FIG. 1. In FIG. 3, diagrammatic representation of the configuration of part of the operation device 1 is omitted.

The operation element 4 has an operation body 41, an interposed body 42, a pressing body 43, and a detection body 44 as shown in FIG. 3.

The operation body 41 is a key top partially exposed to the outside of the exterior chassis 2 through a hole part 231 formed into a shape corresponding to the outer shape of this operation body 41 in the second placement part 23. The operation body 41 is displaced according to pressing operation by the user to protrude from and retract into the second placement part 23. This operation body 41 is formed into a substantially circular cylindrical shape having a recess 411 opened in the direction toward the detection body 44 disposed in the exterior chassis 2. Furthermore, the operation body 41 has a flange part 412 extending toward the radial outside on the side of the end part located in the exterior chassis 2 in this operation body 41 (side of the end part opposed to the detection body 44). This flange part 412 is formed into such a size as to abut against the inner surface of the exterior chassis 2. This prevents removal of the operation body 41 from the exterior chassis 2.

The interposed body 42 is disposed in the recess 411 and gets contact with the pressing body 43. That is, the interposed body 42 is provided between the operation body 41 and the pressing body 43. Such an interposed body 42 is formed by an enclosing body 422 in which a dilatant fluid 421 is enclosed.

The dilatant fluid 421 has the property of behaving like a solid in response to sudden deformation (comparatively fast deformation) and behaving like a fluid in response to comparatively gradual deformation (comparatively slow deformation). Such a dilatant fluid 421 is formed by e.g. a viscoelastic elastomer.

The enclosing body 422 is formed by a synthetic resin having flexibility. When the dilatant fluid 421 is deformed, this enclosing body 422 is deformed according to this deformation. Such an enclosing body 422 has a contact surface 423 that gets contact with the pressing body 43.

The pressing body 43 transmits, to the detection body 44, a pressing force transmitted from the operation body 41 via the interposed body 42. Specifically, the pressing body 43 moves toward the detection body 44 in association with the displacement of the operation body 41 and presses this detection body 44. Such a pressing body 43 has a base part 431, a dome part 432, a spacer 433, a pressing sheet 434, and a pressing part 435.

The base part 431 is formed into a sheet shape. The dome part 432 and the spacer 433 are disposed on a disposing surface 4311 opposed to the interposed body 42 in the base part 431.

Of these, the dome part 432 is equivalent to the flexible part of the present invention and is formed into a substantially hemispherical shape by a metal. This dome part 432 has flexibility and is deformed depending on a pressing force transmitted from the interposed body 42 in association with the displacement of the operation body 41 to generate a feeling of click. Furthermore, this dome part 432 functions also as the biasing member of the present invention. When the dome part 432 is deformed, the resilience of this dome part 432 acts on the operation body 41 as a biasing force in the protrusion direction of this operation body 41. By this resilience, the operation body 41 when the dome part 432 is deformed reverts to the initial position as the position before the retraction into the exterior chassis 2.

The spacer 433 is provided around the dome part 432. This spacer 433 prevents the expansion of this dome part 432 along the disposing surface 4311 and the collapse of this dome part 432 when the dome part 432 is deformed.

The pressing sheet 434 is provided on the spacer 433 in such a manner as to cover the dome part 432.

The pressing part 435 is attached on the opposite side to the side opposed to the interposed body 42 in the base part 431, i.e. on the side of the detection body 44. Furthermore, this pressing part 435 is in contact with a surface sheet 441 of the detection body 44 and presses the detection body 44 when the pressing body 43 is displaced toward this detection body 44 together with the operation body 41 and the interposed body 42.

The detection body 44 is formed by a pressure-sensitive sensor that detects the pressing force of the operation body 41 transmitted via the interposed body 42 and the pressing body 43. Specifically, the detection body 44 has the surface sheet 441, an upper contact sheet 442, a spacer 443, a contact 444, a lower contact sheet 445, and a back surface adhesive sheet 446 in that order from the side of the pressing body 43, and is formed by attaching them to each other. Of these, the surface sheet 441 and the upper contact sheet 442 function also as the biasing member of the present invention, the details of which will be described later.

The surface sheet 441 is in contact with the pressing part 435.

The spacer 443 disposed between the upper contact sheet 442 and the lower contact sheet 445 forms a predetermined gap between this upper contact sheet 442 and the contact 444 provided on the lower contact sheet 445.

The back surface adhesive sheet 446 located on the opposite side to the side on which the contact 444 is disposed in the lower contact sheet 445 is attached to a substrate or the like (not shown) and thereby the detection body 44 is fixed in the exterior chassis 2.

In such a detection body 44, because the gap is formed between the upper contact sheet 442 and the contact 444 by the spacer 443, electrical conduction is not made between this upper contact sheet 442 and the contact 444 in the state in which the operation body 41 is not pressed.

On the other hand, when the operation body 41 is pressed and the surface sheet 441 and the upper contact sheet 442 are pressed by the pressing body 43, the surface sheet 441 and the upper contact sheet 442 bend toward the lower contact sheet 445. The upper contact sheet 442 is thereby electrically connected to the contact 444. The upper contact sheet 442 and the lower contact sheet 445 on which the contact 444 is provided are each connected to a control device provided in the exterior chassis 2, and the control device can determine whether or not the operation body 41 is pressed by detecting an output signal (voltage) from the lower contact sheet 445.

In the present embodiment, the detection body 44 has a configuration to detect the pressing force (pressure) of the operation body 41. However, it is not limited thereto and may be formed by a sensor capable of further detecting the pressing position and area of acting of this pressing force in the detection surface to detect the pressure. Furthermore, the detection body is not limited to the detection body 44, by which the pressure is detected through the contact of the bending upper contact sheet 442 with the contact 444, and a detection body of another system (e.g. resistive film system, surface acoustic wave system, capacitive system, etc.) may be used.

In such an operation element 4, the amount of stroke of the operation body 41 is measure obtained by adding the measure between the upper contact sheet 442 and the contact 444 in the state in which they are not in contact with each other to the measure between the end surface on the side of the detection body 44 in the operation body 41 and the pressing sheet 434 in the state in which the flange part 412 abuts against the inner surface of the exterior chassis 2 (state shown in FIG. 3).

[Action of Operation Element]

The operation element 4 acts in the following manner in response to pressing of the operation body 41.

Figure 4:
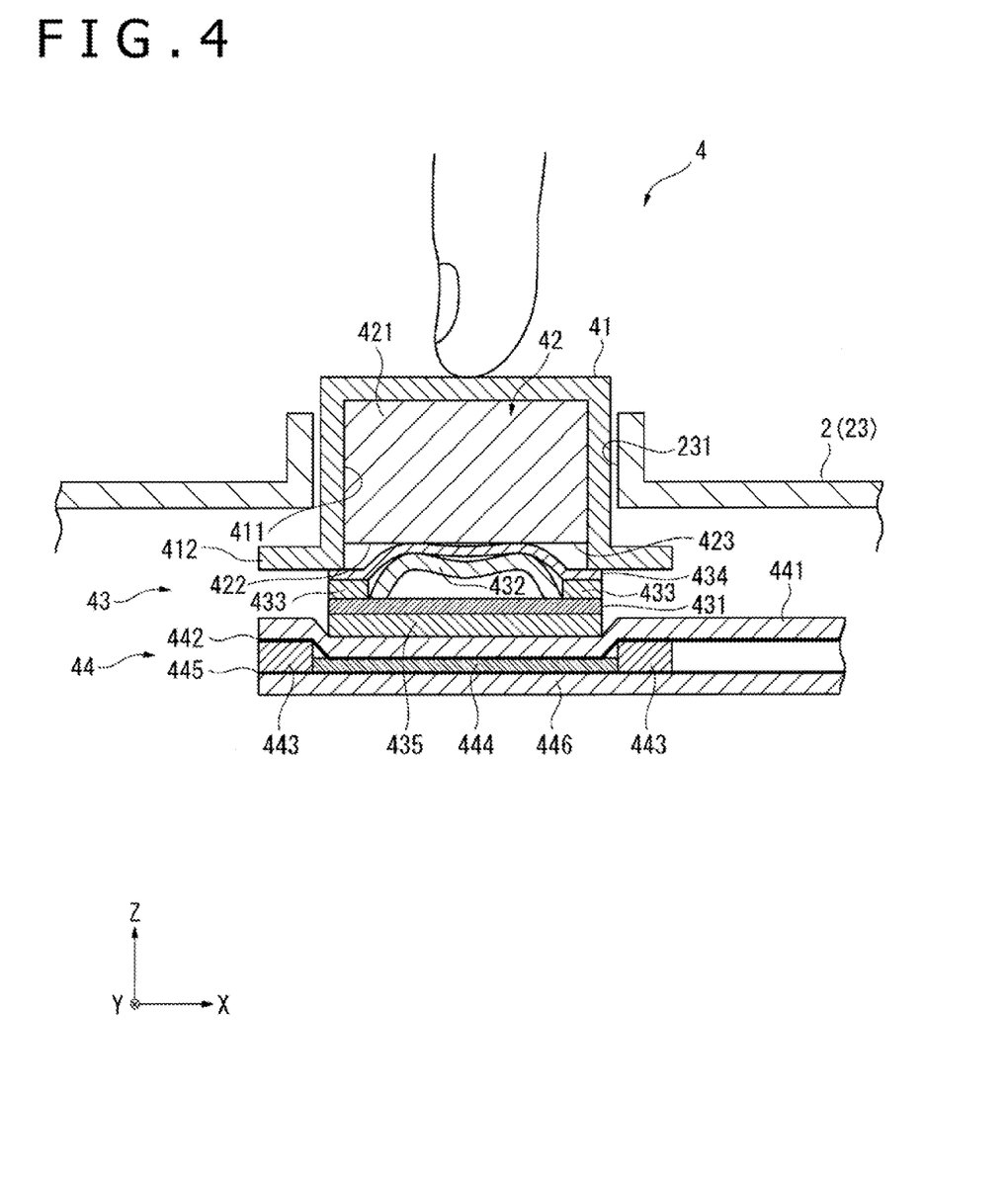
FIG. 4 is a sectional view showing the operation element pressed comparatively fast in the first embodiment.

FIG. 4 is a sectional view showing the state of the operation element 4 when the operation body 41 is pressed comparatively fast.

When the operation body 41 is pressed comparatively fast (when a comparatively large pressing force is instantaneously added), the dilatant fluid 421 of the interposed body 42 provided between this operation body 41 and the pressing body 43 behaves like a solid. Thus, as shown in FIG. 4, the pressing force acting on the operation body 41 is made to act on the pressing body 43 via the interposed body 42 almost without being lost.

Specifically, when the operation body 41 is pressed comparatively fast, the pressing force acting on this operation body 41 is applied to the pressing sheet 434 in contact with the contact surface 423 and the vicinity of the peak of the dome part 432. The dome part 432 thereby bends and the vicinity of the peak of this dome part 432 is inverted, which generates a feeling of click. Along with this deformation of the dome part 432, the pressing body 43 moves toward the detection body 44 to press this detection body 44. By this pressing, conduction is made between the upper contact sheet 442 of the detection body 44 and the contact 444 and a signal indicating that the operation element 4 is pressed is output from the lower contact sheet 445 to the control device.

Figure 5:
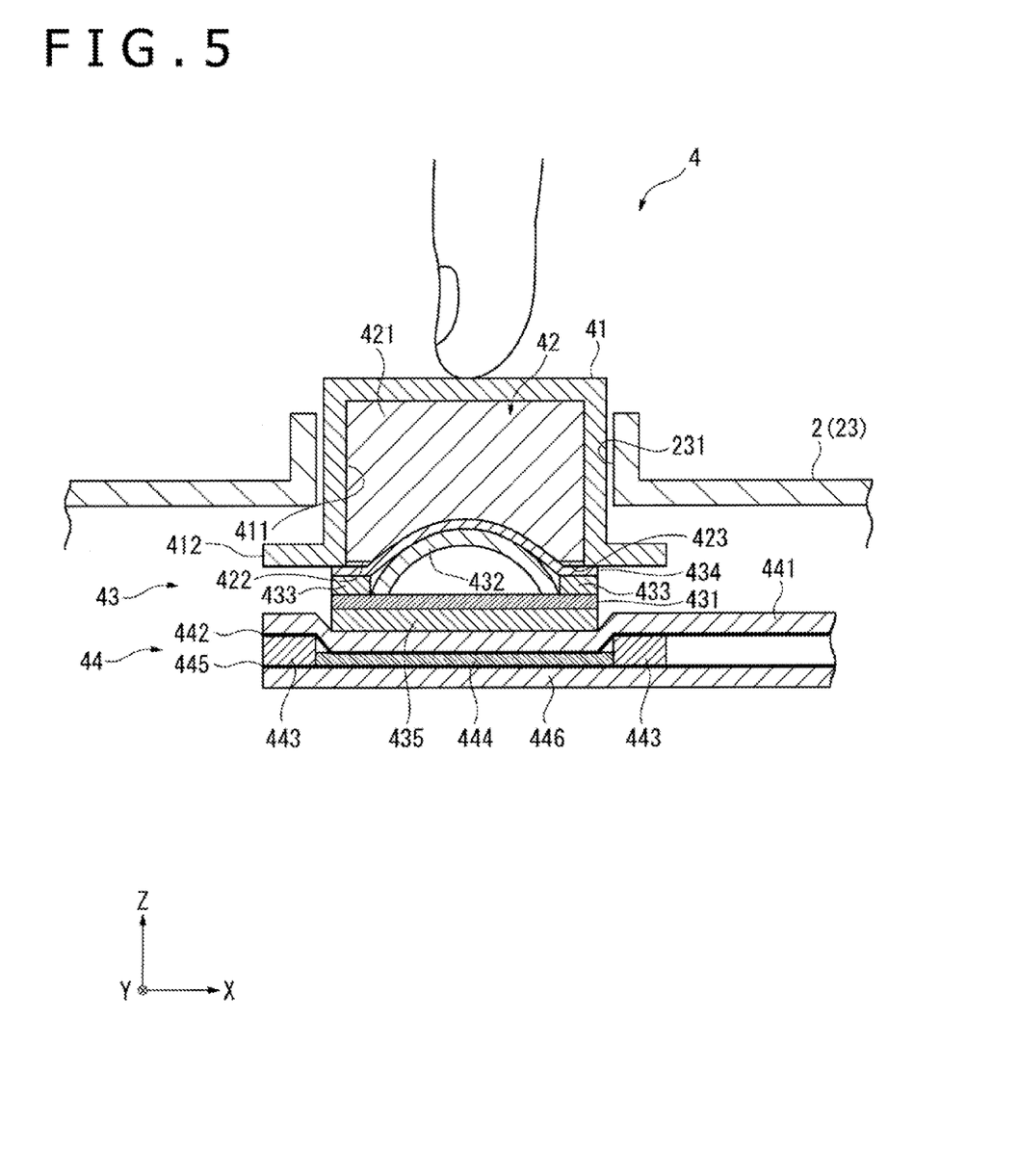
FIG. 5 is a sectional view showing the operation element pressed comparatively slow in the first embodiment.

FIG. 5 is a sectional view showing the state of the operation element 4 when the operation body 41 is pressed comparatively slow.

On the other hand, when the operation body 41 is pressed comparatively slow (when a pressing force is applied over time), the dilatant fluid 421 behaves like a fluid (liquid). Thus, as shown in FIG. 5, by the pressing force acting on the operation body 41, the dilatant fluid 421 is deformed from the position of the contact surface 423 corresponding to the vicinity of the peak of the pressing sheet 434 and the dome part 432 in accordance with the shape of this peak vicinity and this pressing force gradually acts on the pressing body 43. Part of the vicinity of the peak of the dome part 432 and the pressing sheet 434 is thereby housed in the operation body 41. In this manner, without the deformation of the dome part 432, the pressing body 43 is pushed down toward the detection body 44 to press this detection body 44. Similarly to the above-described case, conduction is then made between the upper contact sheet 442 of the detection body 44 and the contact 444 and a signal indicating that the operation body 41 is pressed is output from the lower contact sheet 445 to the control device.

When the pressing to the operation body 41 is released, the surface sheet 441 and the upper contact sheet 442 return to the original position due to the resilience of these surface sheet 441 and upper contact sheet 442, so that the conduction between this upper contact sheet 442 and the contact 444 is rapidly stopped. At this time, due to the return of the surface sheet 441 and the upper contact sheet 442 to the original position, the operation body 41, the interposed body 42, and the pressing body 43 are pushed up in the protrusion direction of this operation body 41 (toward the tip of the Z-direction). Furthermore, the operation body 41 and the interposed body 42 are pushed up in this protrusion direction by the resilience of the dome part 432 (when the displacement of the operation body 41 is comparatively fast) and the resilience of the dilatant fluid 421 (when the displacement of the operation body 41 is comparatively slow) besides the resilience of the surface sheet 441 and the upper contact sheet 442. This causes the respective configurations 41 to 44 of the operation element 4 to revert to the initial position (position before the operation body 41 is pressing-operated).

According to the operation device 1 in accordance with the present embodiment described above, the following effects are achieved.

When the displacement of the operation body 41 according to pressing operation is comparatively fast, the dilatant fluid 421 of the interposed body 42 behaves like a solid and thus the pressing force to the operation body 41 is rapidly transmitted to the detection body 44 almost without being lost.

On the other hand, when the displacement of the operation body 41 is comparatively slow, the dilatant fluid 421 behaves like a fluid and thus the pressing force to the operation body 41 is gradually transmitted to the detection body 44.

According to this, the displacement of the operation body 41 can be detected by the detection body 44 in response to the pressing operation to the operation body 41. In addition, the operation feeling at the time of the pressing operation to the operation body 41 can be made different by the interposed body 42. Therefore, the operation element 4 with which the operation properties and operation feeling are different depending on the pressing operation to the operation body 41 can be formed.

Furthermore, the pressing body 43 that moves according to the pressing operation to the operation body 41 is provided between the interposed body 42 and the detection body 44. The pressing body 43 has the pressing part 435 that causes the pressing force to act on the detection body 44 and the dome part 432 as the flexible part provided on the side of the operation body 41 relative to the pressing part 435.

According to this, when the displacement of the operation body 41 is comparatively fast, because the dilatant fluid 421 behaves like a solid, the dome part 432 bends to be inverted according to the displacement of this operation body 41 and thus a feeling of click is generated. On the other hand, when the displacement of the operation body 41 is comparatively slow, the dilatant fluid 421 behaving as a fluid functions like a buffer. Therefore, the bending of the dome part 432 according to the displacement of this operation body 41 is hardly caused and a feeling of click is hardly generated. Therefore, the operation feeling of the operation element 4 can be surely made different depending on the pressing operation to the operation body 41.

Moreover, the operation element 4 has the dome part 432, the surface sheet 441, and the upper contact sheet 442 as the biasing member that biases the operation body 41 toward the opposite side to the side of the detection body 44.

According to this, the surface sheet 441 and the upper contact sheet 442 seek to revert after bending due to a pressing force acting on the operation body 41 and cause a biasing force toward the opposite side to the side of the detection body 44 to act on this operation body 41, the interposed body 42, and the pressing body 43. This can surely return this operation body 41 to the initial position. Therefore, the operability of the operation element 4 can be enhanced.

Furthermore, due to the resilience of the surface sheet 441 and the upper contact sheet 442, conduction between the upper contact sheet 442 and the contact 444 is stopped. This stop of the conduction is carried out comparatively fast and thus detection of the pressed state of the operation body 41 by the detection body 44 can be properly carried out.

Moreover, when the displacement of the operation body 41 is comparatively fast, the dome part 432 bends to be inverted according to the displacement of this operation body 41. In addition, this dome part 432 causes a biasing force toward the opposite side to the side of the detection body 44 (biasing force in the protrusion direction of this operation body 41 or biasing force toward the tip of the Z-direction) to act on the operation body 41. Also by this biasing force, the operation body 41 and the interposed body 42 can be returned to the initial position.

On the other hand, when the displacement of the operation body 41 is comparatively slow, the dome part 432 is not deformed and the dilatant fluid 421 is deformed. By the resilience of this dilatant fluid 421, the operation body 41 reverts to the initial position.

As above, the resilience of the surface sheet 441, the upper contact sheet 442, the dome part 432, and the dilatant fluid 421 is utilized as the biasing force to cause the operation body 41 and the interposed body 42 to revert to the initial position. Thus, a biasing member such as spring and rubber does not need to be additionally provided. Therefore, increase in the number of parts of the operation element 4 can be suppressed. In addition, reduction in the thickness of the operation element 4 and hence the operation device 1 can be achieved.

The biasing force to the initial position of the operation body 41 when the displacement of this operation body 41 is comparatively slow may be set based on the amount of dilatant fluid 421 with which the recess 411 is filled.

[Modification of First Embodiment]

Figure 6:
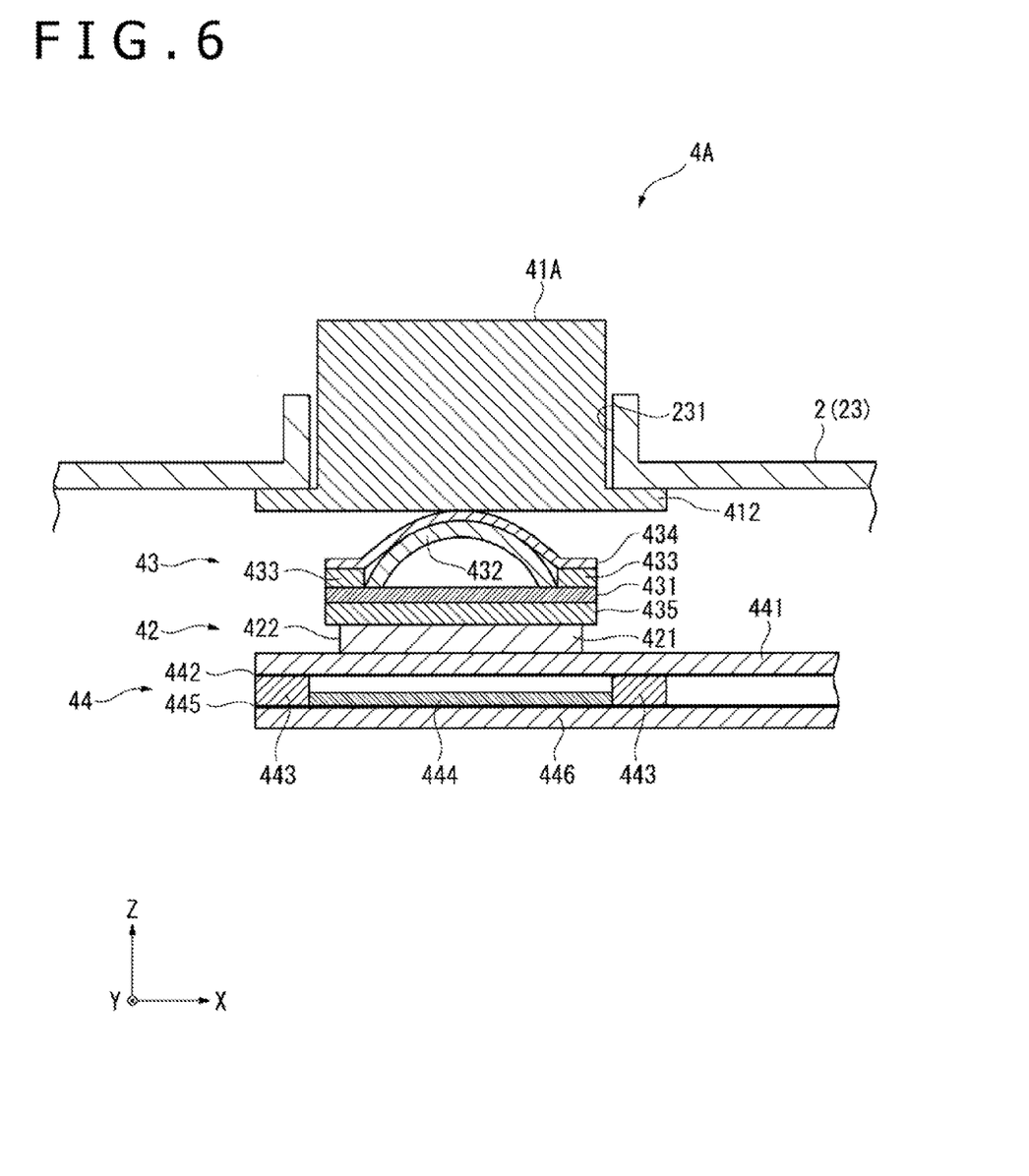
FIG. 6 is a sectional view showing an operation element as a modification of the first embodiment.

FIG. 6 is a sectional view showing an operation element 4A as a modification of the operation element 4.

The operation element 4 of the present embodiment has the configuration in which the interposed body 42, the pressing body 43, and the detection body 44 are sequentially disposed in the direction in which the operation body 41 retracts into the exterior chassis 2. However, the disposing order of the respective configurations is not limited thereto.

For example, as shown in FIG. 6, the operation element 4A as a modification of the operation element 4 has an operation body 41A, the pressing body 43, the interposed body 42, and the detection body 44 and has a configuration in which they are sequentially disposed in the direction in which this operation body 41A retracts into the exterior chassis 2.

That is, in the operation element 4A, the pressing body 43 having the pressing part 435 and the dome part 432 as the flexible part is located between the operation body 41A and the interposed body 42.

The operation body 41A is formed by a substantially circular columnar member with a solid inside and has the above-described flange part 412. However, it does not need to be a solid member as long as a surface made to abut against the pressing sheet 434 of the pressing body 43 is formed in the operation body 41A.

Also by such an operation element 4A, the same effects as those of the above-described operation element 4 can be provided and hence an operation device having this operation element 4A can provide the same effects as those of the operation device 1.

[Second Embodiment]

Next, a second embodiment of the present invention will be described.

An operation device according to the present embodiment has a configuration similar to that of the operation element 4 provided in the above-described operation device 1. However, it is different from the operation device 1 in that the shape of the exterior chassis is different. In the following description, a part that is the same or substantially the same as the already-described part is given the same sign and description thereof is omitted.

Figure 7:
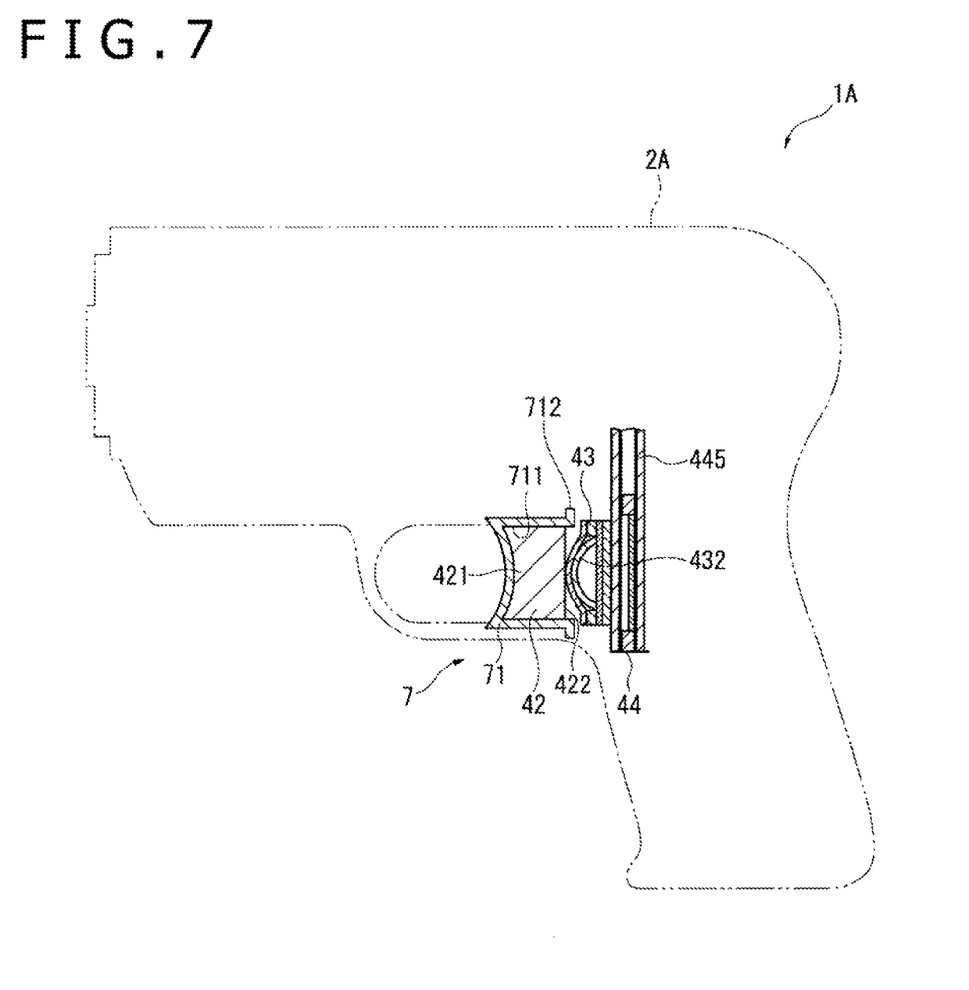
FIG. 7 is a diagram showing an operation device according to a second embodiment of the present invention.

FIG. 7 is a diagram showing an operation device 1A according to the present embodiment.

The operation device 1A according to the present embodiment is formed as a so-called gun controller and has an exterior chassis 2A mimicking a gun as shown in FIG. 7. In this operation device 1A, an operation element 7 having a configuration similar to that of the above-described operation element 4 is employed for the trigger part.

Specifically, the operation element 7 has an operation body 71 operated with a finger (e.g. forefinger) of a user, the interposed body 42, the pressing body 43, and the detection body 44.

Of these, the operation body 71 has a shape like a trigger of a gun. In this operation body 71, a recess 711 opened toward the detection body 44 and a flange part 712 similar to the above-described flange part 412 are formed. The interposed body 42 is disposed in this recess and the enclosing body 422 of this interposed body 42 and the pressing body 43 abut against each other.

Also in the operation device 1A having such an operation body 71, the same effects as those of the above-described operation device 1 can be provided.

Specifically, when the operation body 71 is input comparatively fast and this operation body 71 is displaced (moves) toward the detection body 44, the dilatant fluid 421 of the interposed body 42 provided in this operation body 71 behaves like a solid. Thus, the dome part 432 of the pressing body 43 is deformed and a feeling of click is generated. Furthermore, this pressing body 43 moves toward the detection body 44 to press this detection body 44. Thus, a signal indicating that the operation body 71 is operated is output from the lower contact sheet 445 to the above-described control device.

Furthermore, when the operation body 71 is input comparatively slow and this operation body 71 is displaced toward the detection body 44, the dilatant fluid 421 behaves like a fluid. Thus, the dome part 432 is not deformed and the pressing body 43 moves toward the detection body 44 to press this detection body 44. A signal indicating that the operation body 71 is operated is thereby output from the lower contact sheet 445 to the control device.

Similarly to the above-described operation element 4A, the respective configurations may be disposed in order of the operation body 71, the pressing body 43, and the interposed body 42 toward the detection body 44.

[Modifications of Embodiments]

The present invention is not limited to the above-described embodiments and modifications, improvements, and so forth in such a range that an object of the present invention can be achieved are included in the present invention.

In the above-described respective embodiments, the interposed body 42 having the dilatant fluid 421 is disposed in the recess formed in the operation body 41 or 71. However, the present invention is not limited thereto. Specifically, if the operation body has a solid configuration like the above-described operation element 4A, the interposed body may be disposed between this operation body and the pressing body. Furthermore, the interposed body 42 may be disposed between the pressing body 43 and the detection body 44 like in the operation element 4A.

In the above-described respective embodiments, the configuration is employed in which the operation body 41 or 71 is returned to the initial position by the resilience of the surface sheet 441 and the upper contact sheet 442, which function also as the biasing member, and the dome part 432 and the dilatant fluid 421. However, the present invention is not limited thereto.

Specifically, in order to return the operation body 41 or 71 to the initial position, a biasing member that biases this operation body 41 or 71 toward the opposite side to the side of the detection body 44 may be provided separately from the above-described sheets 441 and 442. As such a biasing member, an elastic body such as rubber, elastomer, and resin and a spring can be cited as examples. Furthermore, a configuration in which the biasing member is provided between the operation body and the detection body can be cited as an example. Such a biasing member may be provided between the flange part 412 and the surface sheet 441 of the detection body 44, and a tension spring as the biasing member may be provided between the flange part 412 and the inner surface of the exterior chassis 2.

If such a biasing member is provided, a clearance can be set between the interposed body 42 and the pressing body 43 and between the pressing body 43 and the detection body 44. Therefore, the amount of stroke of the operation body 41 may be adjusted by adjusting this clearance. In this case, this clearance can be adjusted also based on the amount of the dilatant fluid 421 with which the recess 411 is filled. Furthermore, another member that abuts against the operation body 41 when this operation body 41 retracts may be provided in the exterior chassis and the amount of stroke of the operation body 41 may be adjusted by adjusting the clearance between this another member and the operation body 41. This is the same also in the operation element 7.

In the above-described operation element 4A, the amount of stroke of the operation body 41A may be adjusted by adjusting the clearance between the operation body 41A and the pressing body 43, between the pressing body 43 and the interposed body 42, and between the interposed body 42 and the detection body 44. Moreover, this amount of stroke may be adjusted by adjusting the dimensions of the interposed body 42.

Although the pressing body 43 is disposed between the operation body 41 or 71 and the detection body 44 in the above-described respective embodiments, the present invention is not limited thereto. Specifically, the pressing body may be removed. For example, a configuration may be employed in which the interposed body is disposed between the operation body and the detection body and the pressing body is not disposed. Also with such a configuration, difference in operation properties and operation feeling can be generated between when the operation body is pressing-operated comparatively fast and when it is pressing-operated comparatively slow.

Although the interposed body 42 having the dilatant fluid 421 formed by a viscoelastic elastomer is exemplified in the above-described respective embodiments, the present invention is not limited thereto. That is, a dilatant fluid having another configuration may be employed as long as it is one having dilatancy characteristics.

In the above-described respective embodiments, the dome part 432 made of a metal having flexibility is employed in the pressing body 43 as the flexible part to generate a feeling of click. However, the present invention is not limited thereto. For example, a rubber dome may be employed. Besides, the flexible part is not limited to the configuration having a dome shape and another configuration may be employed as long as a different feeling can be given depending on pressing operation of the operation body. Moreover, the configuration may be so made that a feeling of click is generated when the operation body is displaced comparatively slow.

In the above-described first embodiment, the operation element 4 as the operation element of the present invention is employed for the operation keys independent of each other. Furthermore, in the above-described second embodiment, the operation element of the present invention is employed for the trigger part. However, the present invention is not limited thereto. That is, the configuration of the operation element of the present invention can be applied to a button of any type.

For example, the configuration of the present invention may be applied to the operation elements 3 as the above-described directional keys. In this case, the interposed body 42, the pressing body 43, and the detection body 44 may be each disposed at the respective positions corresponding to both end parts in the X-direction and both end parts in the Y-direction in these operation elements 3.

Furthermore, the configuration of the present invention may be employed for such a trigger-type button (e.g. operation element 62) that a pivot axis is set on one end side and the other end side as the opposite side to this one end side protrudes from and retracts into the exterior chassis and such a button that a pivot axis is set on the center side and the end part sides protrude from and retract into the exterior chassis.

Moreover, in the operation elements 5 as analog sticks, the above-described dilatant fluid may be disposed between the operation body displaceably provided and the detection body that detects the displacement direction of this operation body.

In addition, the operation element of the present invention may be employed for the respective keys of a keyboard connected to a PC or the like and may be employed for another operation device.

Furthermore, for example, an operation element including a pedal such as an accelerator pedal and a brake pedal, a detection body that is pressed by this pedal and detects the pressing force of this pedal, and the interposed body 42 that has the above-described dilatant fluid 421 and is provided between the pedal and the detection body is also included in the present invention.

INDUSTRIAL APPLICABILITY

The present invention can be utilized for an operation element and particularly can be favorably utilized for an operation element employed in an operation device connected to an information processing device such as a PC and a game device.

REFERENCE SIGNS LIST 1, 1A . . . Operation device, 4, 4A, 7 . . . Operation element, 41, 41A, 71 . . . Operation body, 42 . . . Interposed body, 43 . . . Pressing body, 44 . . . Detection body, 421 . . . Dilatant fluid, 422 . . . Enclosing body, 432 . . . Dome part (flexible part, biasing member), 435 . . . Pressing part, 441 . . . Surface sheet (biasing member), 442 . . . Upper contact sheet (biasing member)

The invention claimed is:

1. A controller for an information processing system, comprising:
    an operation element for receiving a pressing force from a pressing operation by a user representing input information to the information processing system, the operation element comprising:
    an operation body displaced according to the pressing operation;
    a detection body that is pressed according to displacement of the operation body and detects the displacement of the operation body; and
    an interposed body interposed between the operation body and the detection body, the interposed body having an enclosing body in which a dilatant fluid is enclosed, the enclosing body having flexibility,
    wherein the dilatant fluid operates to provide a different feeling to the user based upon whether the operation body is pressed quickly or slowly, including that: (i) when the operation body is pressed quickly, a stroke of the operation body is short and the pressing force is transmitted to the detection body rapidly; and (ii) when the operation body is pressed slowly, the stroke of the of the operation body is longer, and the pressing force is transmitted to the detection body slowly.

2. The controller according to claim 1, comprising:
    a pressing body that is provided between the operation body and the interposed body or between the interposed body and the detection body and moves according to pressing operation to the operation body;
    the pressing body having
    a pressing part that causes a pressing force to act on the detection body, and
    a flexible part provided on a side of the operation body relative to the pressing part.

3. The controller according to claim 1, comprising a biasing member that biases the operation body toward an opposite side to a side of the detection body.

4. The controller according to claim 1, wherein the information processing system is a game system.

* * * * *